(12) United States Patent
Hansen

(10) Patent No.: US 11,808,651 B2
(45) Date of Patent: Nov. 7, 2023

(54) INSTRUMENTATION SYSTEM FOR MONITORING OF A NET BARRIER

(71) Applicant: KAHRS HANSEN AS, Bergen (NO)

(72) Inventor: Rolf Kahrs Hansen, Bergen (NO)

(73) Assignee: KAHRS HANSEN AS, Bergen (NO)

( * ) Notice: Subject to any disclaimer, the term of this patent is extended or adjusted under 35 U.S.C. 154(b) by 528 days.

(21) Appl. No.: 17/251,566

(22) PCT Filed: Jun. 12, 2019

(86) PCT No.: PCT/NO2019/050119
§ 371 (c)(1),
(2) Date: Dec. 11, 2020

(87) PCT Pub. No.: WO2019/240591
PCT Pub. Date: Dec. 19, 2019

(65) Prior Publication Data
US 2021/0262877 A1    Aug. 26, 2021

(30) Foreign Application Priority Data
Jun. 12, 2018  (NO) .................... 20180808

(51) Int. Cl.
| G01L 5/00 | (2006.01) |
| G01L 5/10 | (2020.01) |
| A01K 61/10 | (2017.01) |
| E04H 17/00 | (2006.01) |
| A01K 75/00 | (2006.01) |
| G01P 15/18 | (2013.01) |
| G08B 21/18 | (2006.01) |

(52) U.S. Cl.
CPC ............... *G01L 5/10* (2013.01); *A01K 61/10* (2017.01); *A01K 75/00* (2013.01); *E04H 17/017* (2021.01); *G01P 15/18* (2013.01); *G08B 21/182* (2013.01)

(58) Field of Classification Search
CPC .......... G01L 5/10; A01K 61/10; A01K 75/00; E04H 17/017; G01P 15/18; G08B 21/18
USPC ...................................... 73/862.391
See application file for complete search history.

(56) References Cited

U.S. PATENT DOCUMENTS

| 4,097,025 A | 6/1978 | Dettmann et al. |
| 4,209,776 A | 6/1980 | Frederick |
| 4,676,485 A | 6/1987 | Ciordinik et al. |

(Continued)

FOREIGN PATENT DOCUMENTS

| CN | 104920266 A | 9/2015 |
| GB | 2162981 A | 2/1986 |

(Continued)

OTHER PUBLICATIONS

Patent Cooperation Treaty, International Search Report, Int'l App. No. PCT/NO2019/050119, Applicant: Kahrs Hansen AS, Int'l Filing Date: Jun. 12, 2019, dated Feb. 4, 2020.

(Continued)

*Primary Examiner* — Max H Noori
(74) *Attorney, Agent, or Firm* — FLENER IP & BUSINESS LAW; Zareefa B. Flener

(57) ABSTRACT

An instrumentation system for a net barrier comprising at least one tension sensor node attached to one or more threads of said net barrier is described. Also described is a sensor node, and use of this sensor node.

12 Claims, 24 Drawing Sheets

(56) References Cited

U.S. PATENT DOCUMENTS

| | | | | |
|---|---|---|---|---|
| 4,791,410 | A | * | 12/1988 | Larsson ................. G08B 13/20 |
| | | | | 340/544 |
| 9,333,553 | B2 | * | 5/2016 | Wartmann ............... B21F 27/02 |
| 11,237,078 | B2 | * | 2/2022 | Manenti ..................... G01L 5/04 |
| 2003/0020610 | A1 | | 1/2003 | Swanson et al. |
| 2004/0174266 | A1 | | 9/2004 | Larsen |
| 2008/0110408 | A1 | | 5/2008 | Thorvardarson et al. |
| 2011/0102178 | A1 | | 5/2011 | Kalo et al. |
| 2012/0218100 | A1 | | 8/2012 | Doyle |
| 2020/0232904 | A1 | * | 7/2020 | Wendeler-Goeggelmann ............. |
| | | | | G01N 17/04 |
| 2020/0308788 | A1 | * | 10/2020 | Song .......................... E02B 8/06 |
| 2021/0302268 | A1 | * | 9/2021 | Albertelli ................. G01L 1/127 |
| 2023/0218961 | A1 | * | 7/2023 | Huang .................. G06F 3/0488 |
| | | | | 702/173 |

FOREIGN PATENT DOCUMENTS

| KR | 20010080803 | A | 8/2001 |
|---|---|---|---|
| KR | 20120087212 | A | 8/2012 |
| NO | 161593 | B | 5/1989 |
| NO | 20161116 | A1 | 1/2018 |
| WO | 0021051 | A1 | 4/2000 |
| WO | 2014189383 | A1 | 5/2014 |
| WO | 2018080315 | A1 | 5/2018 |

OTHER PUBLICATIONS

Norwegian Patent Office, Norwegian Search Report, NO App. No. 20180808, Applicant: Kahrs Hansen AS, Filing Date: Jun. 12, 2018, dated Jan. 11, 2019.

Danish Patent and Trademark Office, Search Report, Application No. PA 2020 01455, dated Nov. 4, 2021.

Chile Patent Office Search Report, Application No. 202003241, dated May 12, 2002.

* cited by examiner

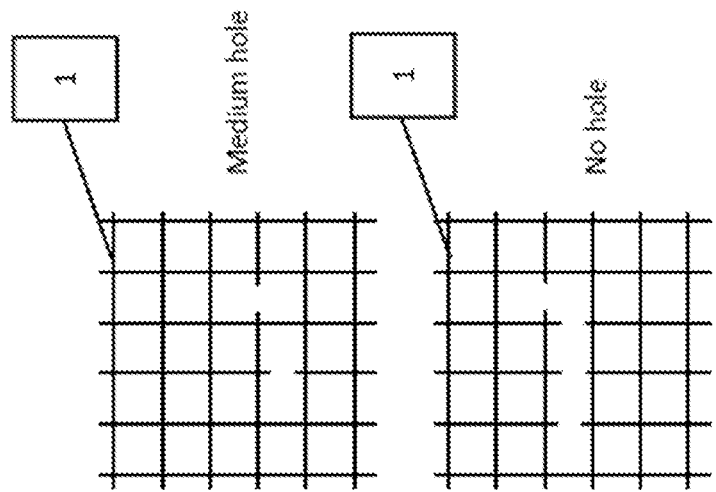
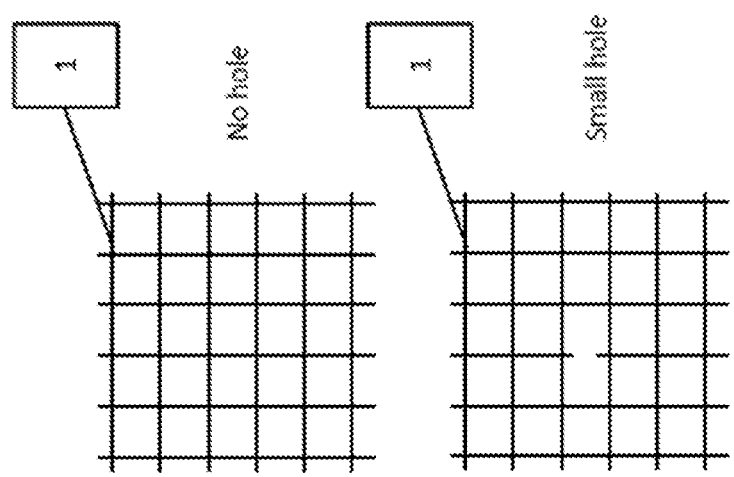
Figure 19

INSTRUMENTATION SYSTEM FOR MONITORING OF A NET BARRIER

FIELD OF THE INVENTION

The present invention relates to monitoring of nets used as barriers deployed in the sea or on land.

BACKGROUND OF THE INVENTION

Net barriers are used to protect and enclose volumes of water and areas on land in a variety of settings.

On land, net barriers are typically used to enclose animals in confined areas or to protect property against intruders. In the sea, net barriers are typically used to enclose aquatic organisms for farming or to protect underwater volumes against intruders, for example protecting harbours against terrorist attacks under water.

Escape of fish from fish farms is a significant problem and leads to financial loss and causes mixing with wild stock and spreading of diseases. From 2010 to 2016, 1,770,000 salmon and trout escaped from fish farms in Norway. 76% of the escapes were related to holes in the net and an average of 13,000 fish escaped per event. 16% of the escapes were related to the net being under water so that the fish could escape above the edge of the net, and an average of 22,000 fish escaped per event. 7% of the escapes were leaks from tanks and 1% of the escapes occurred during transportation of fish from one location to another.

It is one objective of the present invention to establish a monitoring system to be able to detect and thereby handle holes in nets under water quickly and efficiently, thus potentially reduce the number of fish escapes caused by these factors that represent about 92% of fish escapes in Norway. Holes in the net were caused by wear by cables or chains or excessive tension caused by handling of weights, vessel propellers, dead-fish pumps, etc. Quick and efficient handling of damages require quick, sensitive and reliable detection of the damages. It has been reported from Norwegian farms in 2018 that huge holes in nets have been present un-noticed for several weeks—leading to massive escapes. If these leaks had been detected by a monitoring system, repair or other types of actions would be triggered and escapes significantly reduced.

It is another objective of the present invention to establish a monitoring system able to detect and thereby handle holes in net barriers on land.

It is yet another objective of the present invention to establish a net structural monitoring system to detect and analyse the structural load on nets used on land or in the sea, typically to predict possible failures due to overload of the net, to detect changes of the load or to detect changes to the integrity of the net.

Several systems have proposed to solve problems related net monitoring, especially to escape of fish. These include closed tanks and land-based facilities.

U.S. Pat. No. 4,676,485 discloses an intrusion warning wire fence secured to spaced supporting poles. The fence comprises one or more electrical and/or optical conductors, preferably optical fibres, which may be either incorporated within one or more tubular wires of the fence. Breakage or distortion of at least one conductor is detected as the conduction capability is reduced.

NO161593 describes a system for detection of breakage in the net used for farming of salmon. The net threads include an insulated electrical wire that causes a change in the electrical field if the wire is broken. The resulting electrical impulse is then detected and used to generate an alarm.

U.S. Pat. No. 4,791,410 describes a system for use in underwater barrier nets. The net has a flexible tubing which contains a pressurized coloured liquid that escapes in case of fracture or rupture of the tubing. This leads to visual indication of the location of the fracture.

US2004174266 describes a system for use in fish farming facilities where the net threads have electrically conductive wires arranged in circuits where each circuit covers a section. A breakage of the circuit, a monitoring apparatus detects a change in an electrical parameter and the breakage can be localized to the specific section.

WO2014189383 describes a fish cage design to avoid fish escape. The design involves strength elements and techniques to avoid wear on the net cage by anchor chains.

SUMMARY OF THE INVENTION

The present invention relates in a first aspect to an instrumentation system for a net barrier, wherein the instrumentation system comprises at least one tension sensor node and a computer, wherein the tension sensor node is attached to one or more threads of said net barrier, wherein said tension sensor node is connected to said computer, and wherein said computer monitors tension in said threads.

In a preferred embodiment, the sensor node is connected electrically to said computer.

In a preferred embodiment, the computer issues a signal when a tension change in one or more of the threads occurs.

In a preferred embodiment, said signal is an alarm.

In a preferred embodiment, the system comprises multiple sensor nodes connected to multiple threads and said computer and wherein said computer monitors the tension field of the entire net or a section thereof.

In a preferred embodiment, the computer issues an alarm when the tension changes are above predetermined threshold-values.

In a preferred embodiment, the computer issues an alarm when the tension changes are above predetermined threshold-values when the measured tension is compared to reference tension values measured under similar or identical external conditions.

In a preferred embodiment, said sensor node contains means for measurement of acceleration.

In a preferred embodiment, the acceleration is measured along minimum one axis.

In a preferred embodiment, the tension and acceleration measurements are used to determine tension as a function of acceleration.

In a preferred embodiment, the net barrier is arranged on land or in the air.

In a preferred embodiment, the net barrier is arranged in water.

In a preferred embodiment, the sensor node contains means for measurement of pressure.

In a preferred embodiment, the pressure measurement is used to determine the elevation at the position of said sensor node.

In a preferred embodiment, the tension sensor is a strain sensor and can measure static as well as dynamic tension.

In a preferred embodiment, the tension sensor has a piezoelectric stack or piezoelectric film, and can measure dynamic tension.

In a preferred embodiment, the sensor nodes can measure tension during environmental excitation of the said net.

In a preferred embodiment, an actuator is used to generate tension in said net, wherein said sensor nodes measure the resulting accelerations and tensions and wherein the computer analyses the data and detect changes.

In a preferred embodiment, the actuator acts on one or more clump weights.

In a preferred embodiment, the actuator is concentric and acts on the net meshes.

In a preferred embodiment, a microprocessor communicates via a serial bus with connected sensors, and wherein the said microprocessor communicates with the said computer via a serial bus wherein each sensor node can be individually addressed.

In a preferred embodiment, the serial bus between the microprocessor and the sensors is a I2C serial bus.

In a preferred embodiment, the serial bus to the computer is RS485 serial interface.

In a preferred embodiment, the system is used to monitor the integrity of the net barrier.

In a preferred embodiment, the system locates the position of a damage in the net.

In a preferred embodiment, the total wavefield sampled by tension sensors at several locations along the rim of the net is monitored.

In a preferred embodiment, the relation between motion and tension is calculated.

In a preferred embodiment, the net tension as a function of sea current is measured, and is used as an indicator of marine growth on the net threads.

In a preferred embodiment, the tension sensor measures both magnitude and direction of the tension.

In a preferred embodiment, the actuator could be hydraulically, pneumatically or electrically activated.

In a preferred embodiment, the sensor is a metal foil or semiconductor strain gauge.

In a preferred embodiment, the sensor detects both the amount and direction of tension.

In a preferred embodiment, the sensor node comprises a piezoelectric strain gauge based tension sensor, and wherein the gauge has dynamic response and is attached to a nylon web.

In a preferred embodiment, the sensor node includes a 3-axis accelerometer and a pressure sensor.

In a preferred embodiment, the sensor node has a clock.

In a preferred embodiment, the system measures dynamic and static signatures of the net.

In a preferred embodiment, the net is a net in an aquaculture cage.

In a preferred embodiment, the net is a barrier used during fishing, i.e. trawling or seine fishing.

A second aspect of the present invention relates to a sensor node connected to a computer and to a rope, web sling or load strap, wherein the sensor node comprises at least two strain sensors, which measures only dynamic tension.

In a preferred embodiment, the strain sensors are piezoelectric strain gauges.

A third aspect of the present invention relates to the use of a sensor node, for the determination of static tension in a rope, web sling or load strap, wherein a tension wave pulse travels between at least two sensors, and wherein the distance between these at least two sensors is known, and wherein the measured speed of the tension wave pulse (transmit time) is indicative of the static tension (load) of the rope, web sling or load strap.

DETAILED DESCRIPTION OF THE INVENTION

Preferred embodiments of the invention will be described with reference to the following drawings.

Figure 15:
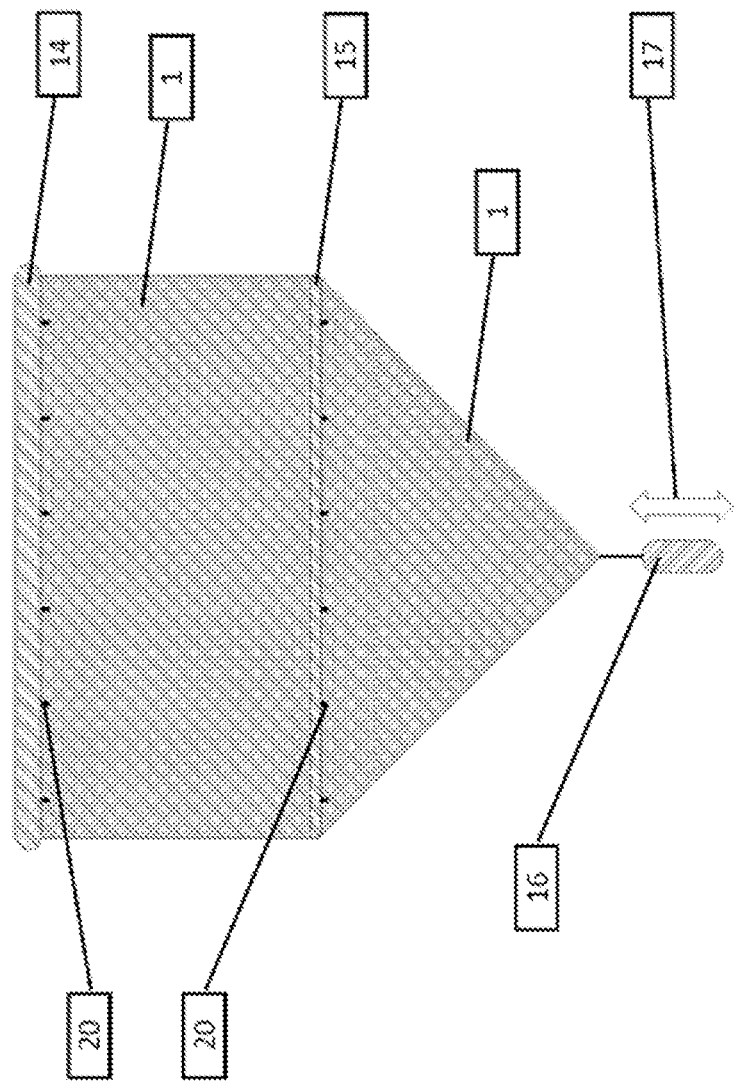

FIG. 15 shows an underwater net (1) cage with a floating collar (14), sensors (20) near the floating collar (14) and the sinker tube (15). The tubular bottom is normally used for collection of dead fish. A clump weight (16) is used to form the conical shape of the cage and is equipped with an internal actuator able to generate a vertical force (17) that sets up a tension field in the net barrier (1).

Figure 16:
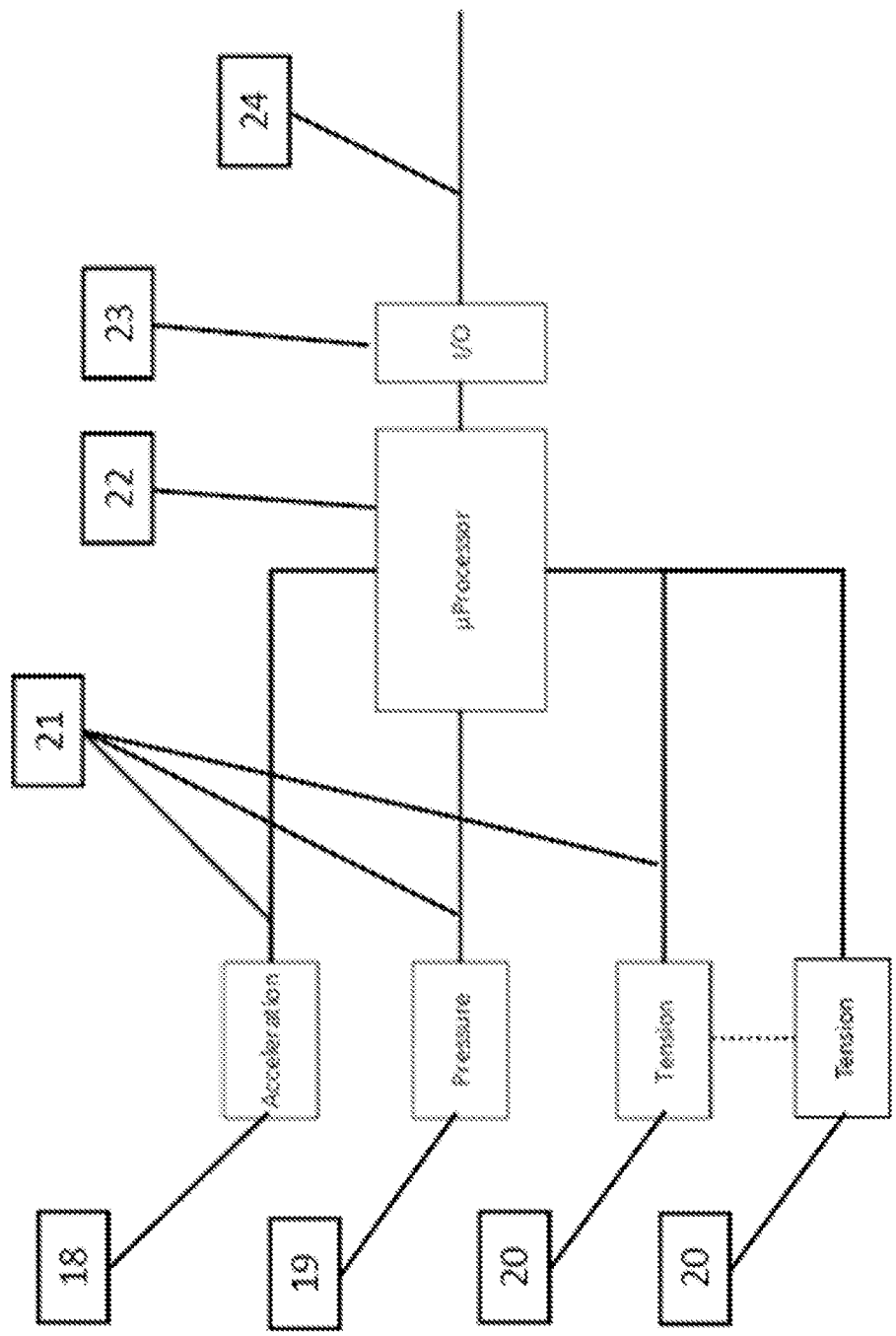

FIG. 16 shows a sensor node (3) with sensors for acceleration (18), pressure (19) and one or more for tension (20). The sensors communicate with an electronic module via an interface (21) and where the module has a microprocessor (22) and an interface driver (24) whereby the module can communicate over an interface (24) with the rest of the system. The interfaces (21) or (24) may be electrical conductors, fibre optic conductors or wireless connections, i.e. radio link on land and acoustic communication in the sea.

Figure 17:
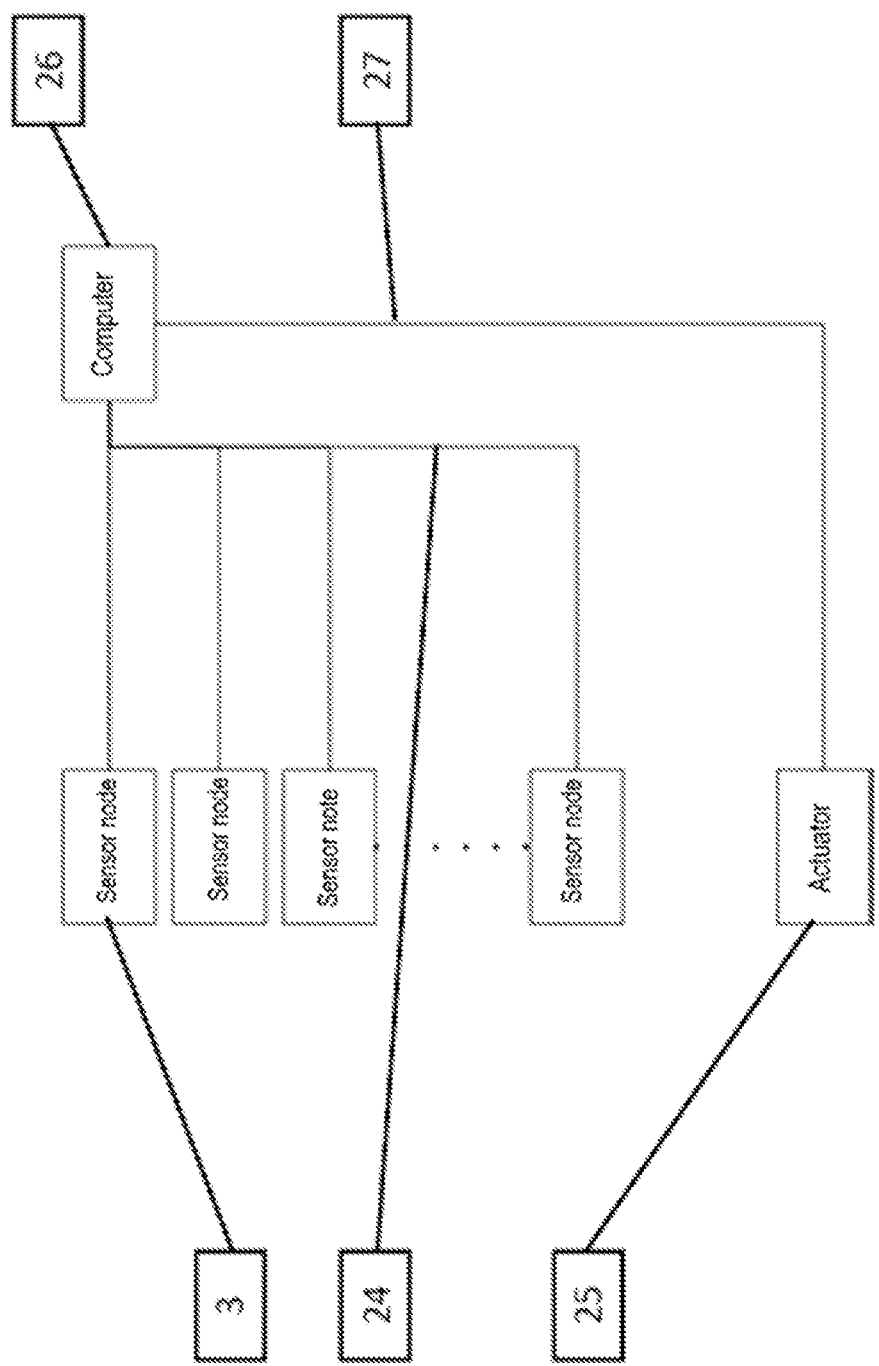

FIG. 17 shows several sensor nodes (3) connected to a computer (26) via cables (24) and an actuator (25) connected with a cable (27) to the computer (26).

Figure 18:
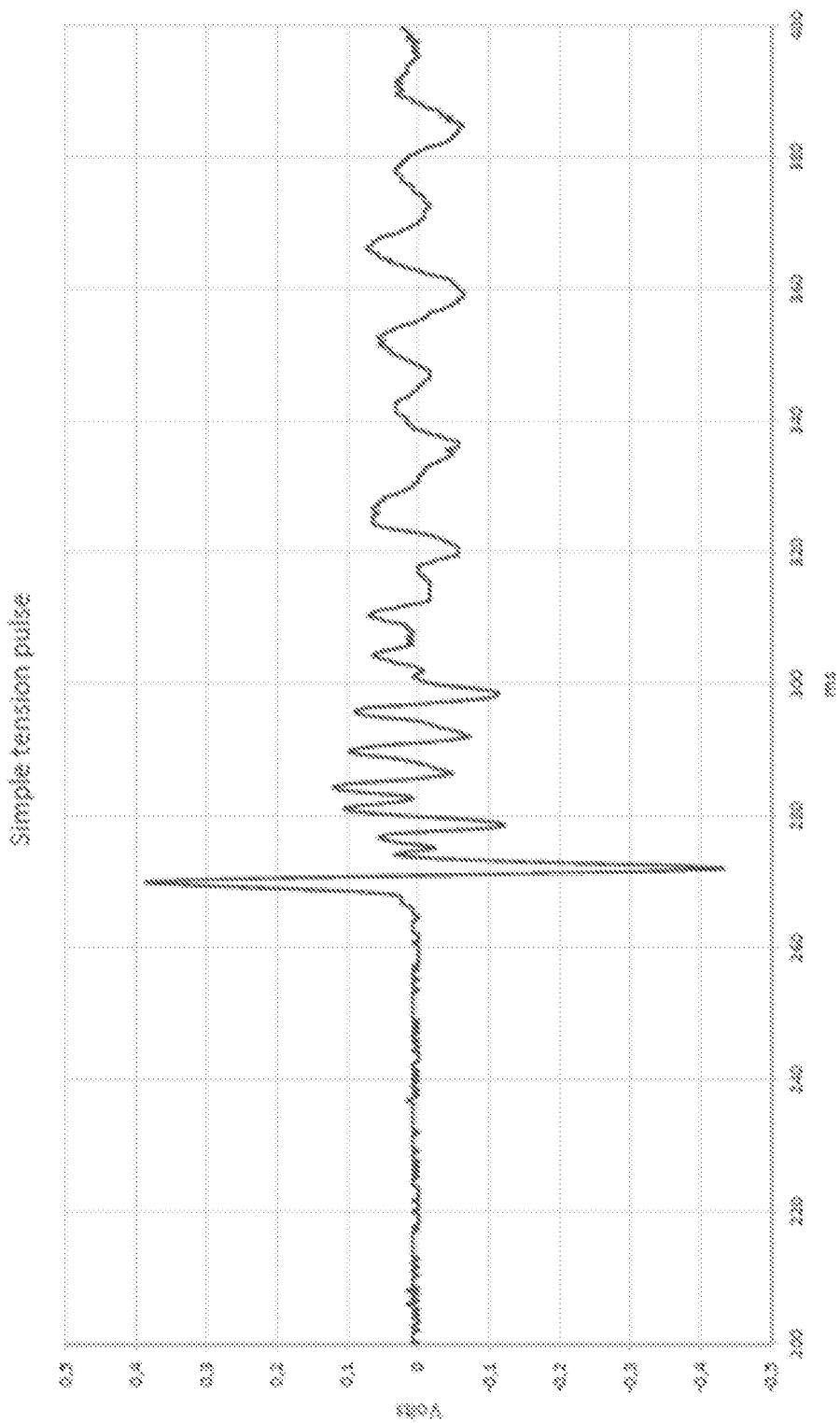

FIG. 18 shows the results from experiment a) below.

FIG. 19 shows the net (1) with no hole and with 3 different holes.

Figure 20:
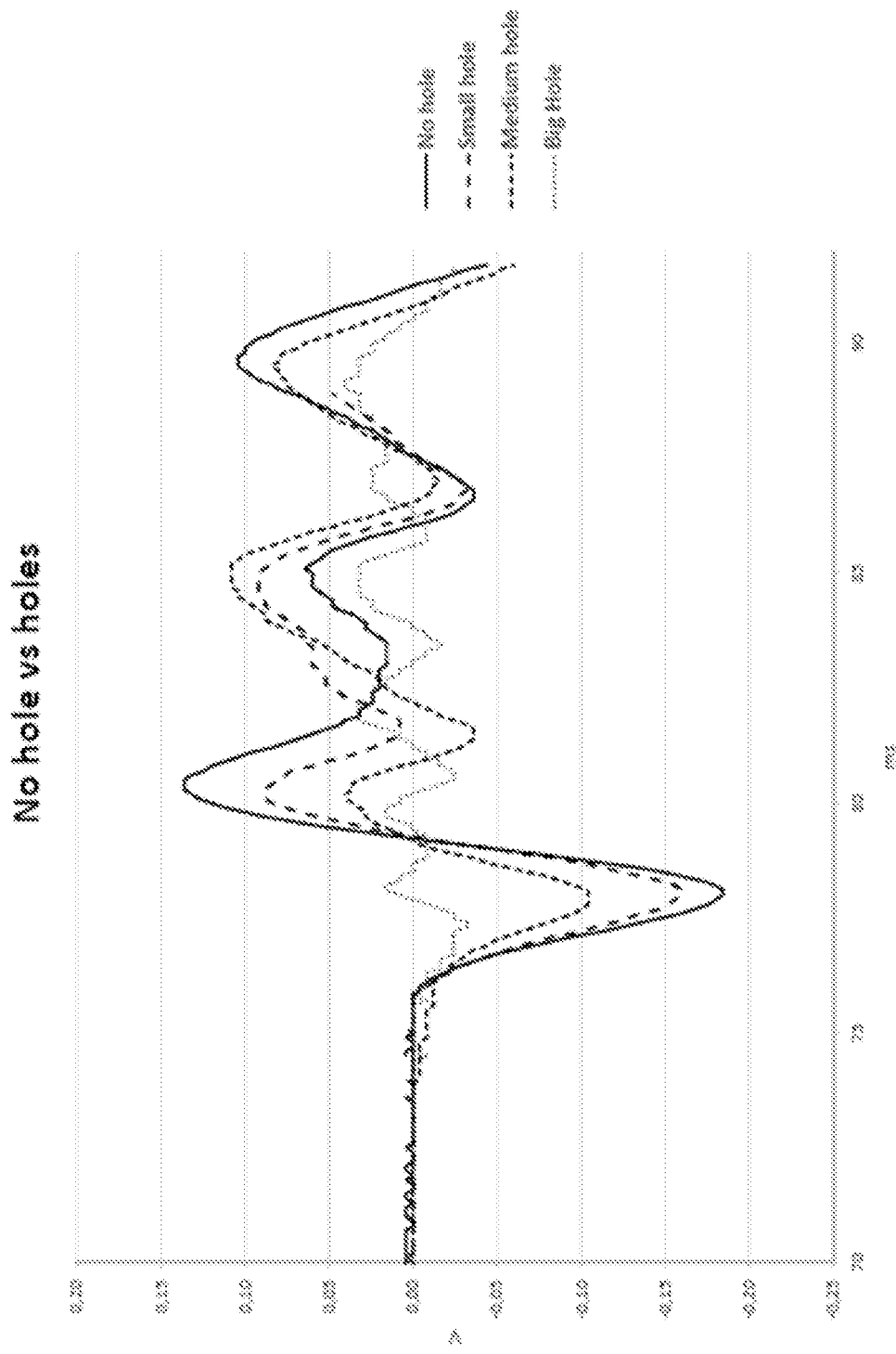
Figure 21:
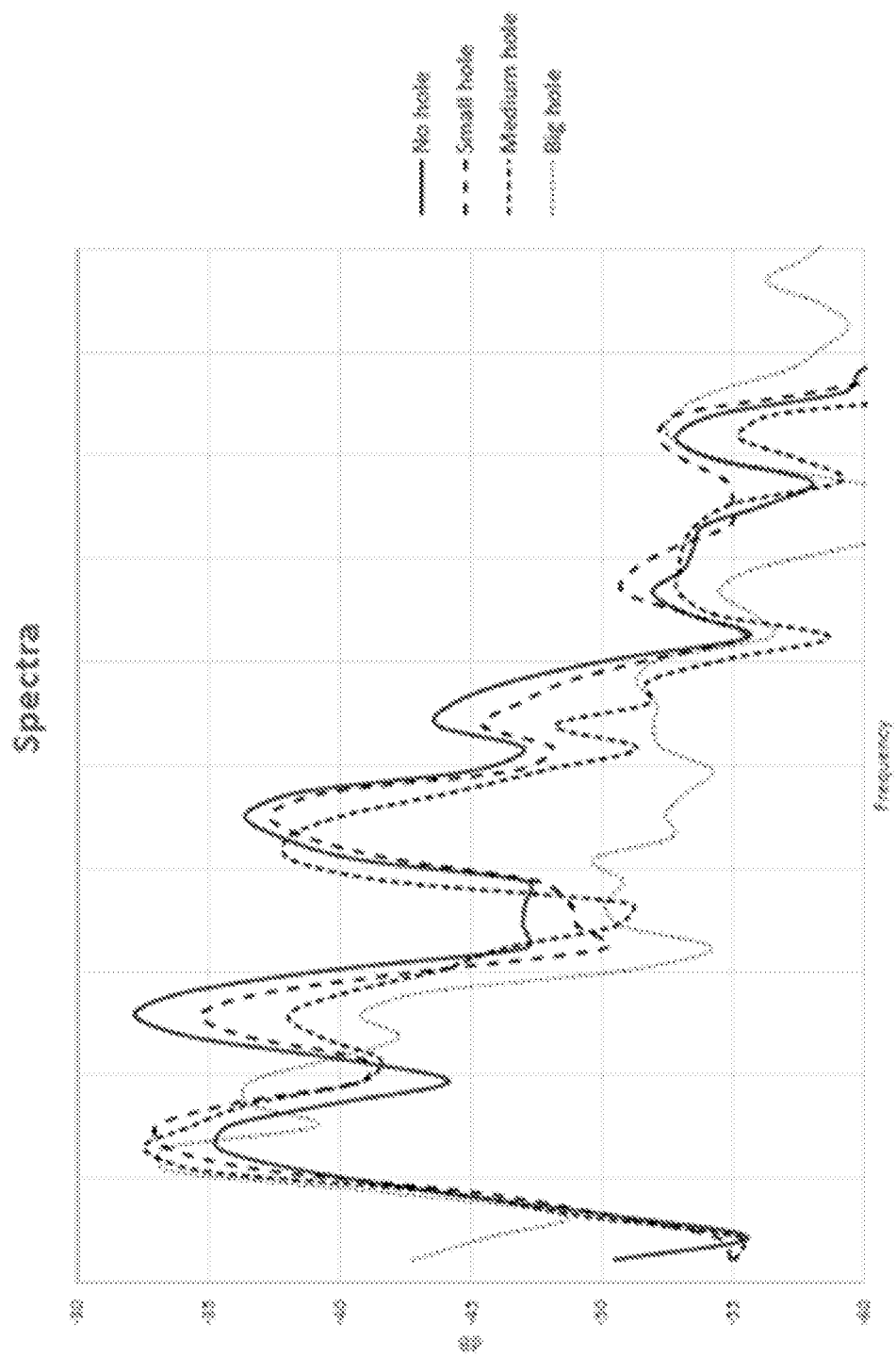

FIG. 20 shows the time series when the holes are in the tension pulse transmission path and FIG. 21 shows the corresponding relative frequency spectra.

Figure 22:
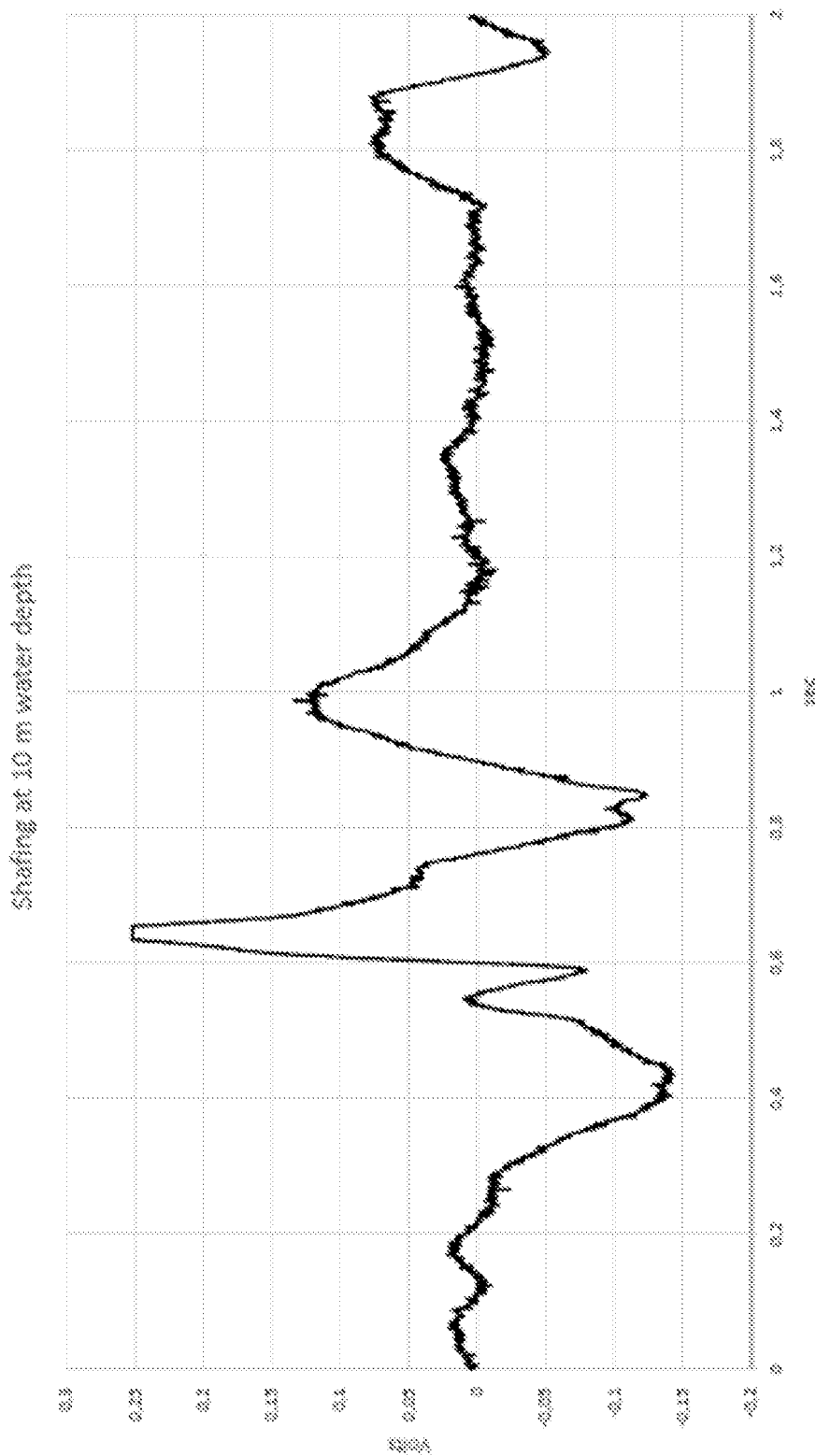

FIG. 22 shows the signal detected by the web (28) mounted sensor (10) when a diver made shafing signals at a water depth of 10 m on a full scale net pen for fish farming.

Figure 23:
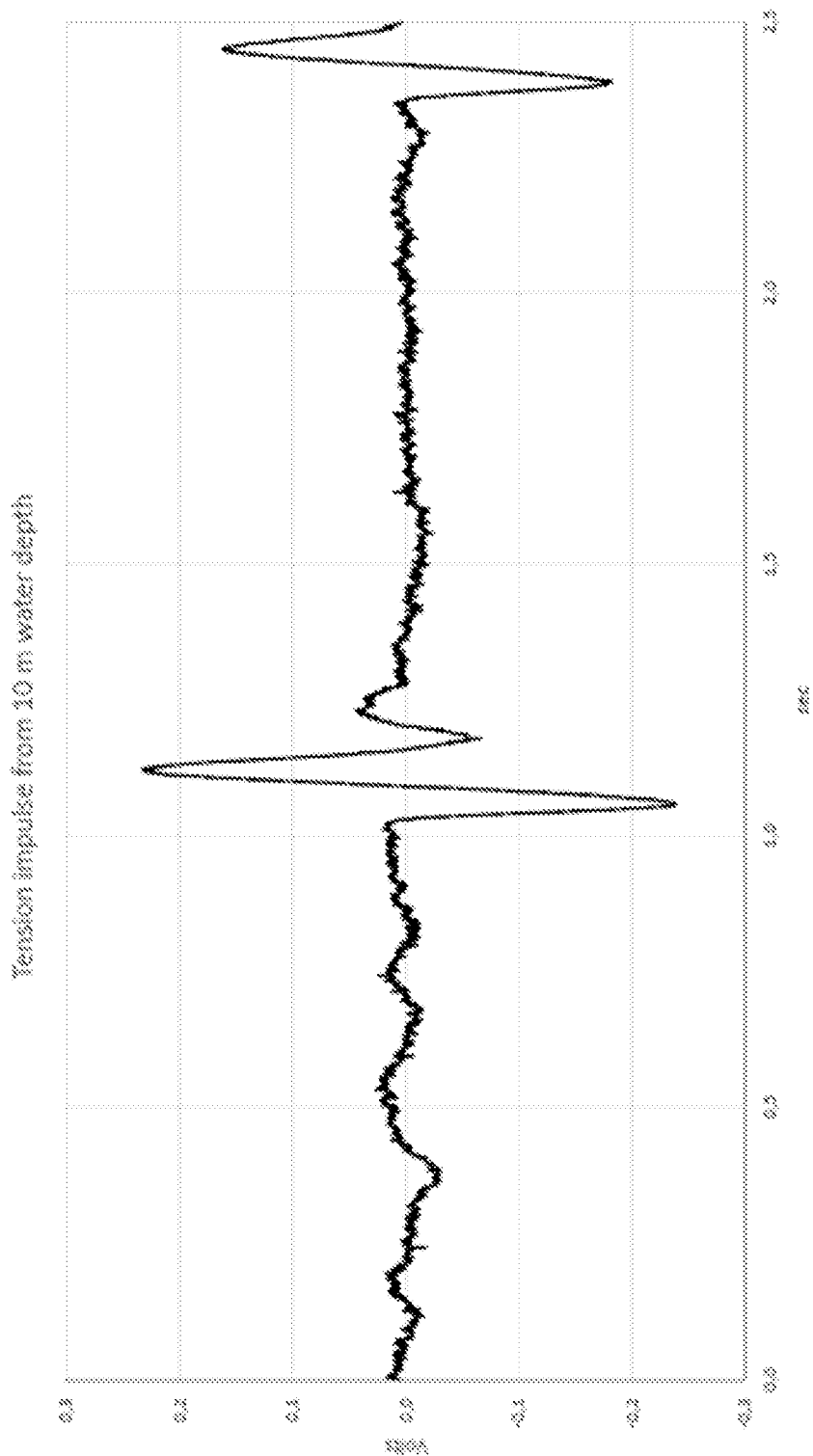

FIG. 23 shows the signals when the divers made tension pulses in the same location.

Figure 24:
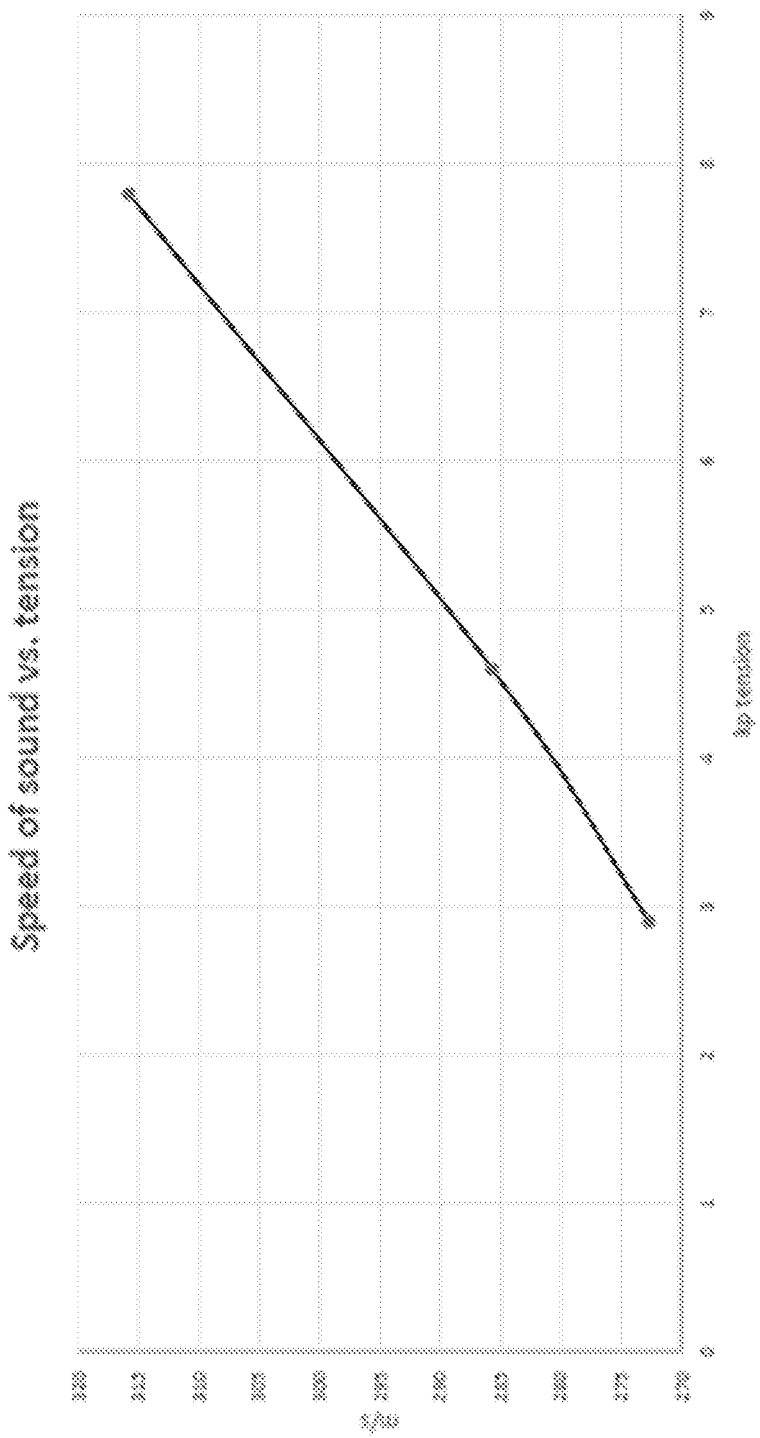

FIG. 24 shows the tension wave speed measure as a function of load.

Note that figures are not necessarily to scale.

The present invention addresses net barriers in the sea and on land, where the net threads or twines may be made of wires or ropes and the materials may be metal or organic compounds. The net threads or twines are organised in meshes.

To make the barrier effective, it is important to maintain the integrity of the barrier and to detect breakages and holes as well as to locate the damage so that repair can be carried out. A typical example is a fish farming cage where a hole leads to escape of fish causing economical loss, possible spreading of diseases to wild stock as well as mixing of wild and farmed stocks. Another example, on land, is a hole caused by an intruder where the cutting of the hole may be performed without causing detectable changes of the net tension.

To provide data on the state of the net, it is important to monitor the load on the net. This could represent for example the amount of marine growth on an underwater net or it could be the amount of tension in a net barrier. The tension could be generated by external forces like wind or current or it could be generated by an intruder attempt.

The present invention relies on the dynamic or static surface properties of the net, i.e. the system response between external forces and resulting net tension. Any elastic surface can be excited such that both transverse and longitudinal waves are generated. In the case of an underwater net, transversal waves will be quickly damped due to the viscous surrounding medium, whereas longitudinal waves will only be slightly damped. In the case of a net on land, viscous damping is much less or absent. The invention makes use of tension wave propagation in the net. These may also be termed sound waves.

It is a requirement for tension wave propagation and propagation of static tension, that the net is preloaded so there is no slack in the threads or twines.

Excitation by one or more net threads or twines will lead to a wave propagated away from the source. If the source is point-like, the wave will typically be spherical and if the source is line-like, the wave will typically be a plane wave. The shape of the wave will depend on the relationship between the amount of preload in different directions as the speed of sound depends on the modulus of elasticity which again depends on the tension.

Figure 1:
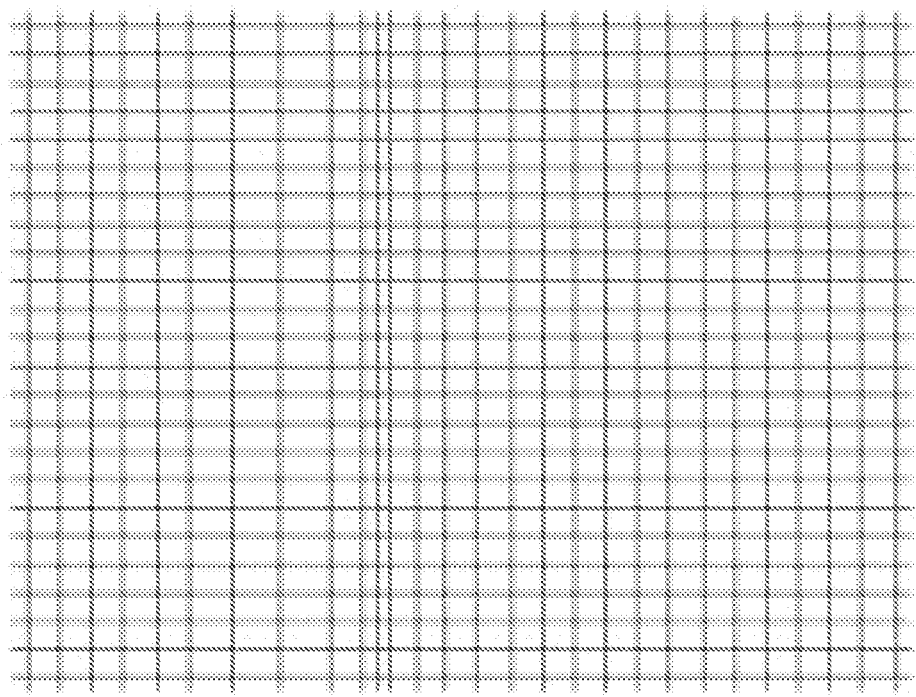
FIG. 1 illustrates how a plane wave propagates in a net (1). The illustration is valid for both transverse waves and tension waves, although transverse waves will be severely dampened in water.
Figure 2:
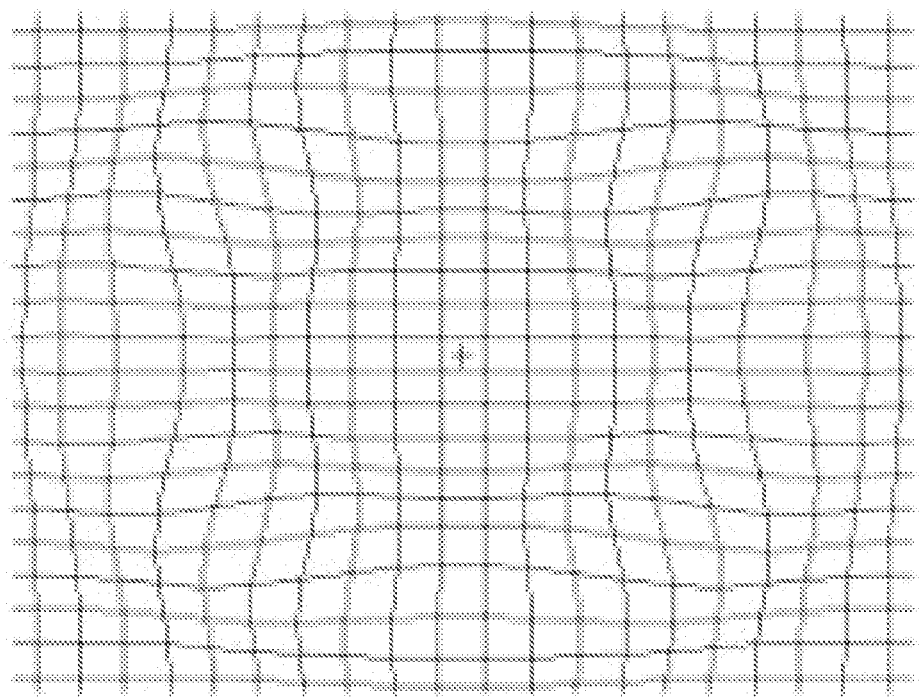
FIG. 2 illustrates how a spherical wave propagates.
Figure 3:
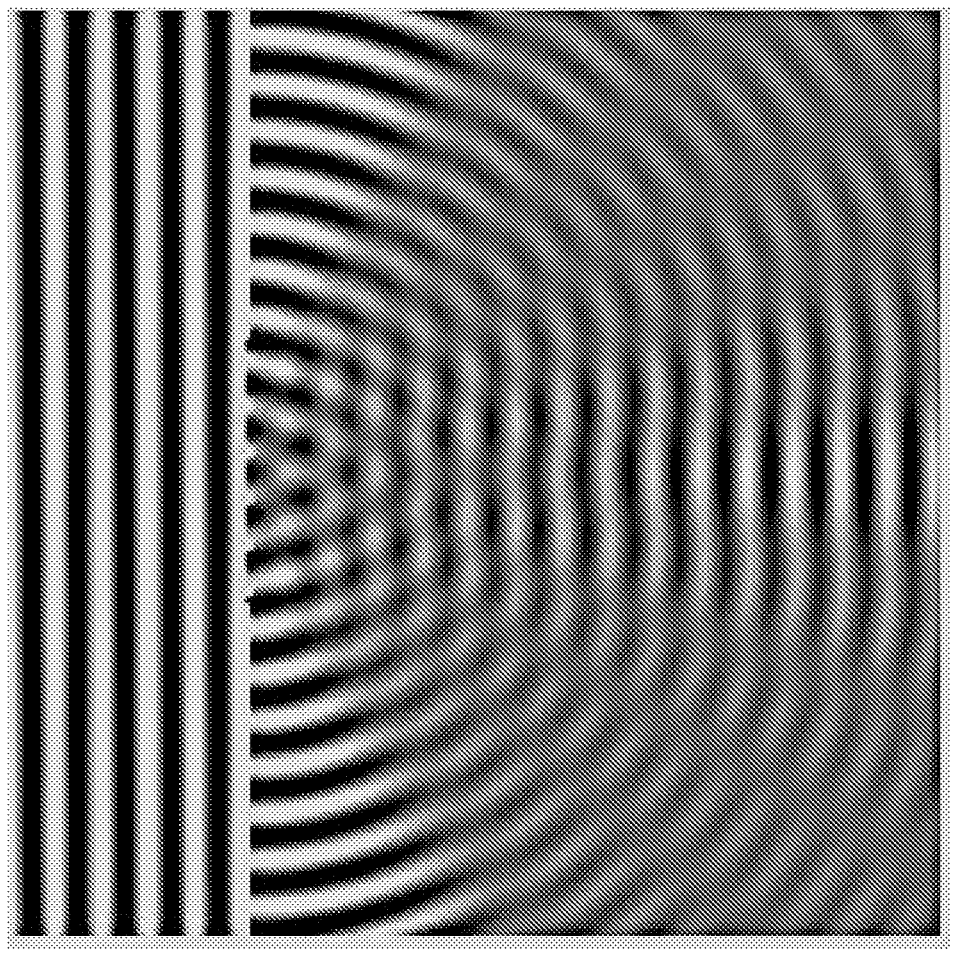
FIG. 3 illustrates how the presence of two wave sources generates a diffraction wave field that is qualitatively different than plane wave and spherical wave propagation in a net without faults.

FIG. 1 shows the propagation of a plane wave and FIG. 2 shows the propagation of a spherical wave. In case of a hole in the net, the forces will be diverted around the hole and new sources will be established on each side of the hole, hence a diffraction pattern will be established as illustrated in FIG. 3.

Excitation of the net will also lead to resonant behaviour of the net and individual threads. According to Mersenne's law, the frequency of the $n^{th}$ harmonic of the wave is $$f_n = \frac{n}{2L}\sqrt{\frac{T}{\mu}}$$

Here, n is the harmonic number, f is the frequency in Hz, L is the length, T is the tension in Newtons and μ is the linear density or mass per unit length. A hole in the net will disturb the propagation of the waves and will also affect the thread resonance as both the tension and the effective length of some threads will be affected.

Monitoring of individual threads with respect to resonance requires many tension sensors and an added difficulty is the effect of connected threads that may dampen certain resonant frequencies.

To monitor the total wavefield sampled by tension sensors at several locations along the rim of the net is one possible method. Excitation can either be from the environment or from a specific excitation source designed for the purpose. It can either be static, impulsive, harmonic or harmonic bursts.

In the sea, environmental excitation could be during wave-action of the sea surface and anomalies will lead to changes in the tension compared to a fault-free net representing a reference. Vertical movement of the floating collar will under normal circumstances lead to increased tension in the net threads. With a hole in the net, this tension will be reduced above the hole. Therefore, tension as a function of acceleration is a good parameter, especially in bad weather conditions with wave actions.

On land, environmental excitation could be due to wind, and anomalies will lead to changes in the tension compared to a fault-free net representing a reference. The relationship between motion and tension will typically change if the net is damaged and the comparison of the signals against a reference representing a fault-free net, will reveal the damage.

Timing and shaping of the excitations are however not under control, hence the use of controlled excitation is an advantage compared to environmental excitation. This is especially advantageous with respect to signal-to-noise ratio as several time series may be averaged. As noise is uncorrelated, averaging over several excitation cycles will thus improve the overall signal-to-noise ratio.

In the case of an underwater net, marine growth is a concern and the net normally require frequent cleaning.

Spraul et. al. (Spraul, C., Pham, H-D., Arnai, V., Reynaud, M. Effect of marine growth on floating wind turbines mooring lines responses. 23$^{erne}$ Congrès Francais de Mécanique. Lille, Septembre 2017) use the following formula to describe the drag on a line as a function of flow:

$$\text{Drag} = \frac{1}{2}\rho D C_d \left[\frac{\frac{N}{\left(\frac{m}{s}\right)^2}}{m}\right]$$

Where ρ is the water density, D is the diameter of the rope and $C_d$ is the drag coefficient set to 1.2.

The same authors use the following formula to describe the line added mass $M_a$:

$$M_a = \rho V C_a \left[\frac{\text{kg}}{\text{m}}\right]$$

Where V is the line volume per unit length and $C_a$ is the added mass coefficient set to 1.05.

The net tension as a function of sea current will reveal the drag. As the drag correlates well with thread diameter and thus marine growth, it can be used as an indicator of the amount of marine growth on the net threads. In the case of no current, the added mass will provide similar, albeit less sensitive, data.

In water, excitation from sources like shafing from anchor chains, hooks or propellers rupturing the net, predator fish attacking the net, etc., will lead to changes in the net tension. Similar sources can be experienced on land—vehicles, animals, etc., hitting the net or shafing from cables or structures. Tension sensors will be able to detect these changes and an array of sensors will be able to use the phase information to point out the direction to the source of the tension change.

Controlled excitation, meaning direction, tension, pulse shape and time, will be effective means of net excitation. As the excitation energy can be repeated, it is possible to detect changes in net wave pattern so as to give alarms or warnings in case there are abrupt changes. Slowly varying changes can be filtered away. Also, excitations and data acquisition may be more frequent whenever operations known to pose a risk for net breakage are ongoing.

Excitation could be as a short pulse resulting in a transient or it could be a burst with a specific frequency. In the case of a transient, the sensor nodes will measure amplitudes and the time gaps from excitation to detection of the transient. In the case of single frequency bursts, the sensors could use beamforming techniques for detection of the wave-field.

A tension sensor that measures both magnitude and direction of the tension will point in the direction of the source of the change of tension.

Figure 4:
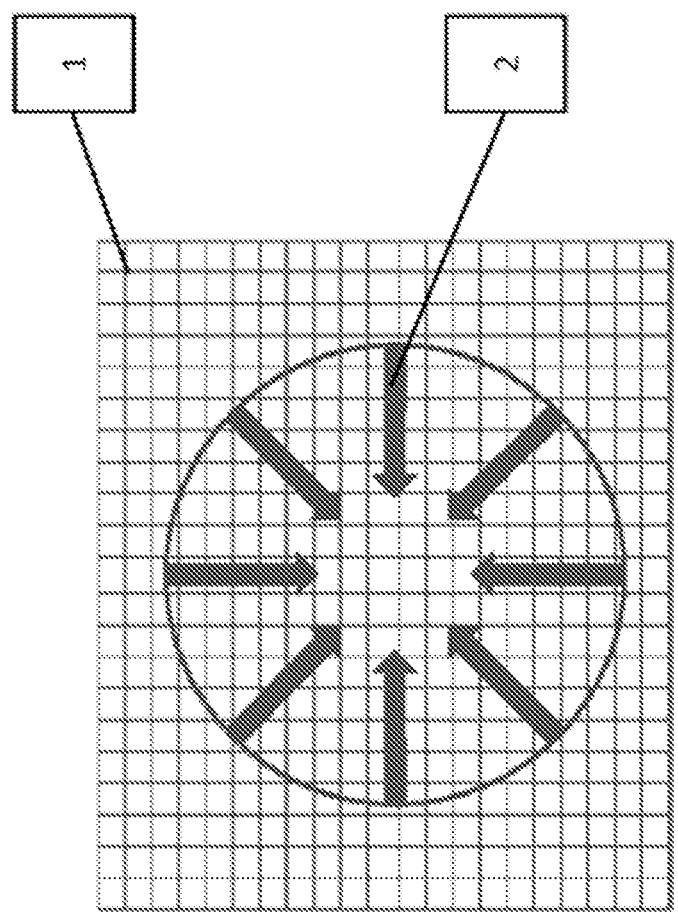
FIG. 4 shows indicates how the forces (2) work on the net (1) with a concentric actuator.
Figure 5:
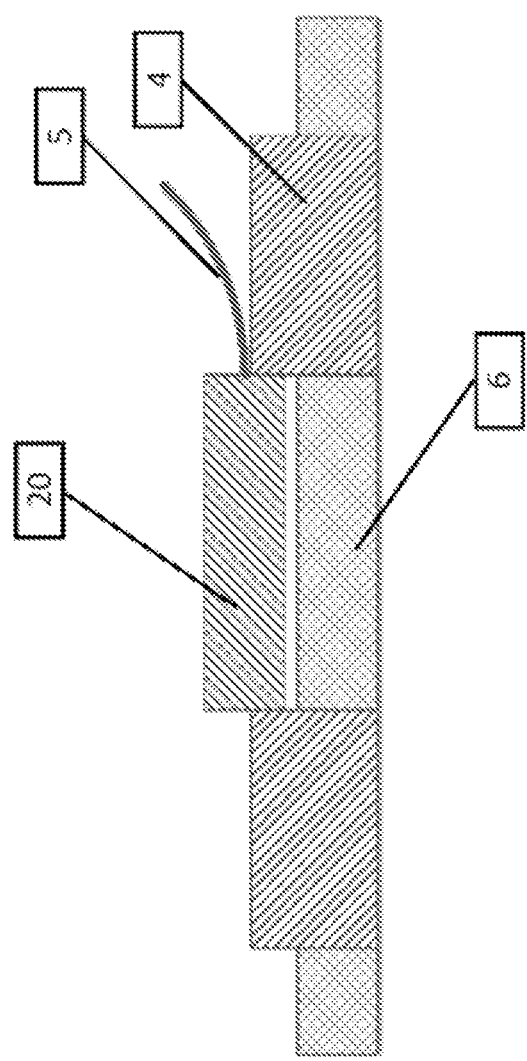
FIG. 5 shows sensor (20) clamped with clamps (4) to the net thread (6) in the direction of the thread and the cable (5) for power supply and communication.
Figure 6:
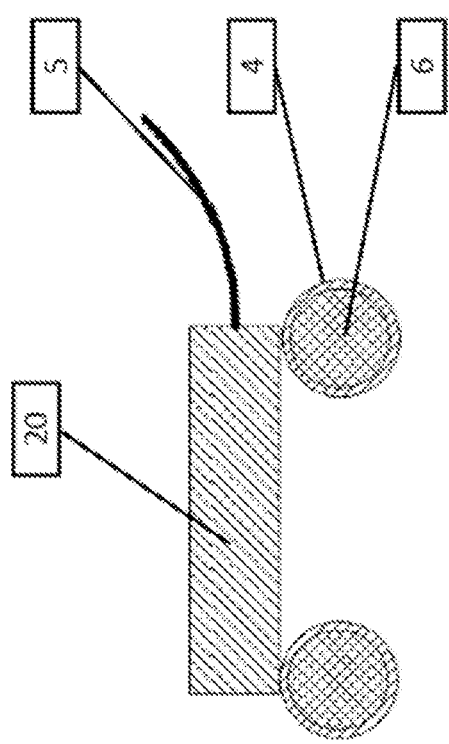
FIG. 6 shows the sensor (20) with clamps (4) fixing the sensor node between two threads (6), perpendicularly to the thread.
Figure 7:
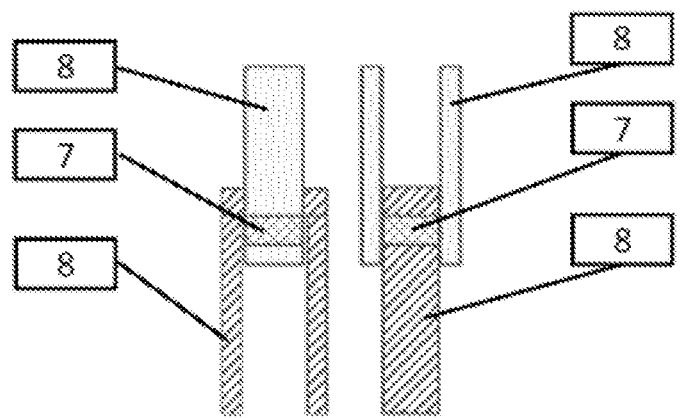
FIG. 7 shows a piezoelectric element (7) between two pullers (8). Force between the pullers will translate to compressional or extensional forces on the piezoelectric element.
Figure 8:
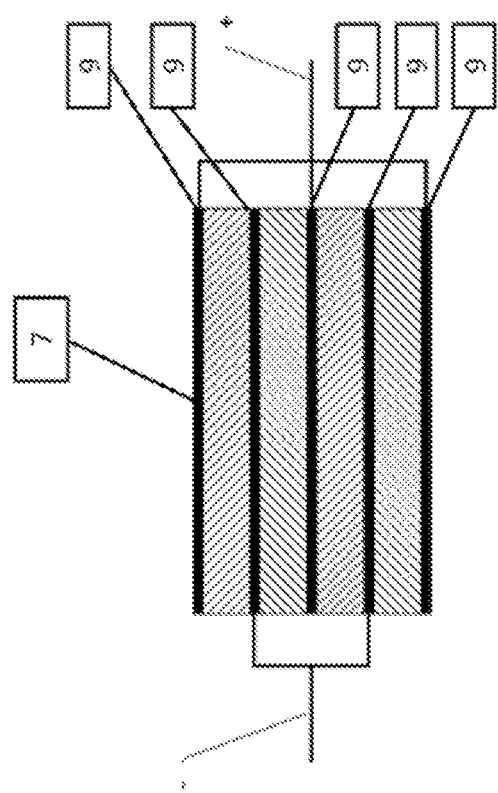
FIG. 8 shows how the piezoelectric element can be constructed as a stack (7) with electrodes (9) between the layers so that the layers are connected in parallel electrically while stacked (i.e. connected in serial) mechanically. This design will lead to higher capacitance than if only one element was used, capable of delivering more charge to the following electronics.
Figure 9:
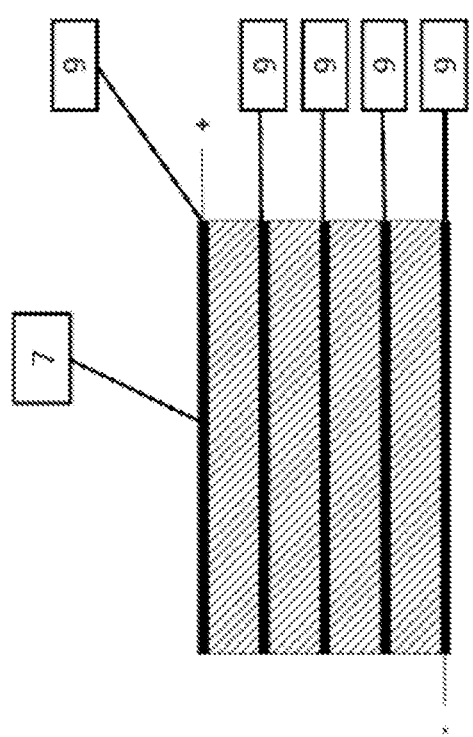
FIG. 9 shows how the piezoelectric element can be constructed as a stack (7) with electrodes (9) between the layers so that the layers are connected in serial both electrically and mechanically. This design will lead to higher voltage than if only one element was used.
Figure 10:
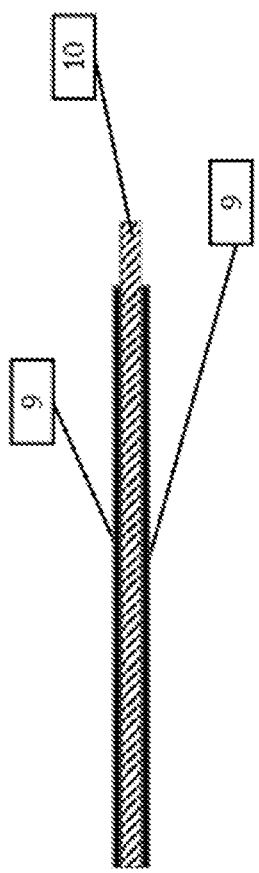
FIG. 10 shows a piezoelectric film strain gauge sensor (10) with electrodes (9).
Figure 11:
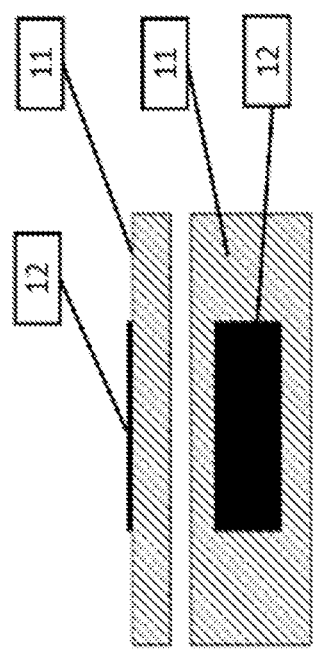
FIG. 11 shows a tension sensor consisting of a metal sheet (11) and a strain gauge element (12) glued or welded to the surface of the metal sheet. The strain gauge element (12) can be either semiconductor material or metal.

The excitation source could be hydraulically, pneumatically or electrically activated and could act on weights already used for suspension of net cages, or it could act directly on the net by a sudden pull towards a centred section of the net—see FIG. 4. An excitation source acting on a weight could be a cylinder with a piston where change of piston position would pull the weight in some direction, alternatively it could consist of two weights where pull between the two would produce reaction forces. An excitation source generating forces as indicated in FIG. 4, could be an elastic sphere fixed to the net being driven by hydraulics or by means of an inductive electrical actuator. Electrical or hydraulic robot grippers may also be used. Concentric action may also be achieved with a rope arranged in a circular loop within the net such that pulling at the end of the rope generates tightening of the loop and thus concentric tension in the net. Especially vertical slits may be difficult to detect without the use of a concentric actuator. Another type of actuator could be a rotating crankshaft where the frequency is determined by the speed of rotation. Yet another type of actuator could be a piezoelectric actuator capable of providing a small, controlled deflection with a high force and short duration as well as to provide a controlled waveform of any shape. Piezoelectric actuators are in many cases ideal as they produce short tension pulses that can easily be detected by sensitive tension sensors.

Depending on the damping (i.e. range and net properties), excitation and detection may use the pulse-echo principle where sensors and excitation source are mounted on the same side of the net. Tension waves are reflected from a line or a surface that represents a step in acoustic impedance (determined by the density and the tension wave speed) and hence produces a reflection.

Sensors will typically be mounted to the rim of the net to sample the wavefield. The sample distance and the number of sensors will determine the angular resolution—the direction to the anomaly—and the aliasing in case beamforming techniques are used. Half a wavelength or less between the sample points controls the aliasing properties according to the Nyquist criterion.

Tension produces relative deformation. This is called strain and it depends on the force on the material and the elastic modulus. A strain sensor is the preferred sensor to use to measure the tension, unlike accelerometers that measures absolute motion and hence absolute deformation. This is not always representative for the tension in the material.

The sensor could be metal foil or semiconductor strain gauge or piezoelectric strain gauge. Note that the latter is only useful for dynamic tension, while metal foil or semiconductor strain gauges can be used for both static and dynamic response.

Piezoelectric strain sensors may be for example PVDF or P(VDF-TrFe) copolymer. PVDF must be stretched and polarized, but P(VDF-TrFe) does not have to be stretched, hence it can be produced in a wide variety of configurations—like cables, sheets, etc. Impedance matching may be necessary close to the piezo sensor to facilitate transmission in an electrical cable.

FIGS. 7, 8, 9 and 10 are examples of elements of piezoelectric sensors.

Strain gauge sensors made of metal or semiconductor material can be glued on to metal plates strong enough to withstand maximum strain and elastic enough to be able to detect minimum strain, such that the plate is always within the elastic range of the material.

Strain sensors can be configured to detect not only the amount of tension, but also direction. The tension in a particular direction can be measured using single strain sensors. The magnitude as well as the direction can be measured using strain gauge rosettes with sensor elements organised in relative directions of for example 0°/45°/90° or 0°/60°/120°.

Figure 12:
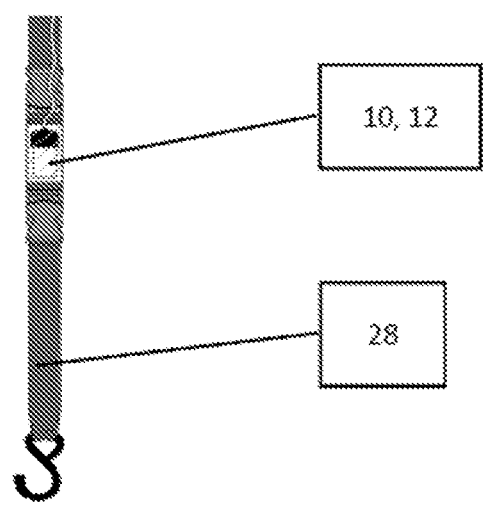
FIG. 12 shows a strain gauge (10 or 12) fixed to a nylon web (28) that has a hook to connect to the net and thereby obtain net tension waves to be detected by the sensor.
Figure 13:
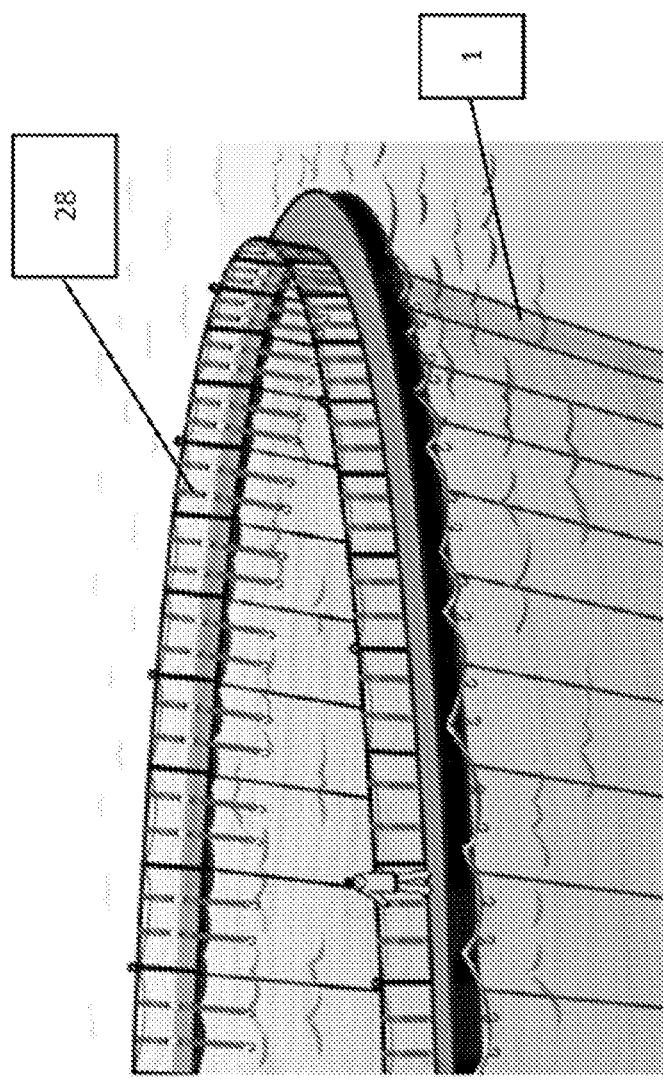
FIG. 13 shows a fish pen net (1) with nylon webs (28) with sensors (10 or 12), two in each pen section.
Figure 14:
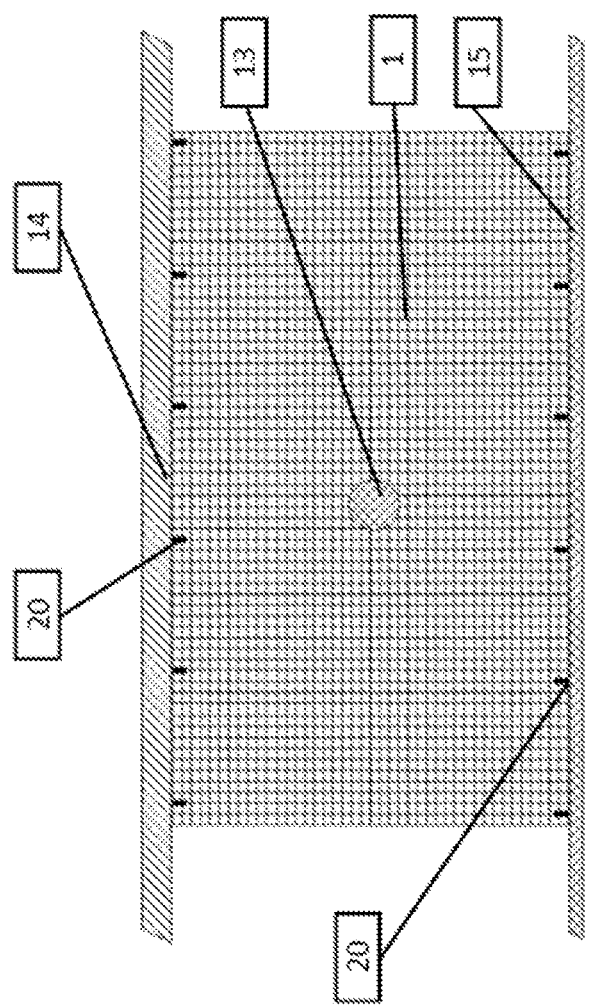
FIG. 14 shows a vertical section of an underwater net (1) cage with sensors (20) at the top near the floating collar (14) and near the sinker tube (15). A concentric actuator (13) can actively excite net tension.

The sensors can be clamped to the threads with a crimping tool so that existing net cages can be equipped with sensors and so that nets of special designs will not be required. Alternatively, sensors can be mounted on straps made of for example nylon (a nylon web) and attached with hooks to the net in one end and to an external structure in the other. The sensors may be glued to the straps. The strap unloads the net in the connected point or region and the strap and the sensor can thereby sense the tension propagating in the net. FIG. 12 shows a sensor mounted to a strap and FIG. 13 shows how a number of sensor straps can be mounted on a net pen for fish farming. This is a convenient installation as sensors do not have to be for underwater use. They can, with battery operation, transmit signals via a radio link and installation. Service is very simple and cost efficient.

Some pens for fish farming are divided into vertical sections that are separated with thick ropes. In this case, tension waves do not propagate from section to section and one must have a minimum of one sensor per section. FIG. 13 illustrates an installation with two sensors per section.

Whenever a net cage is equipped with actuators and sensors, the nets will be inspected, and a baseline signature will be recorded and compared to signals obtained later so that changes can be detected.

The net integrity instrumentation system will include sensor nodes mounted in or connected to the net. It is therefore convenient to include pressure sensors in the devices so that the sensor elevation can be measured. This can be done both under water and on land. On land, highly sensitive barometric sensors exist, capable of measuring elevation changes down to 10 cm.

In order to detect tension versus acceleration, the sensor nodes can include acceleration sensors.

The net integrity instrumentation system thus consists of one or more sensor nodes. It can also include one or more actuators and a computer set up to analyse the data and detect changes from the ideal response obtained with the net with acceptable integrity.

The speed of tension waves (and sound) is according to Kinsler et al., (Kinsler, L. E, Frey, A. R, Coppens, A. B., Sanders, J. V. Fundamentals of Acoustics. Joh. Wiley & Sons. New York 1982)

$$c = \sqrt{\frac{E}{\rho}}$$

Where E is the modulus of elasticity in Pa, $\rho$ is the density in kg/m$^3$ and c is the speed of sound in m/s. As E depends on the static tension in the material, measurement of c can be used to determine the static tension in the net. This way, sensors with only dynamic response—like piezoelectric strain gauges—can be used to measure the average tension between two sensors provided a tension wave pulse travels between at least two sensors, knowing the distance between these two sensors. The same method can be used to detect tension in ropes, web slings or load straps of various materials.

Experiments have been carried out to demonstrate the principle. We were using piezoelectric strain sensor signals fed directly into an oscilloscope.
  a) A 1.5 m by 1.5 m net hanging on land and pre-stretched in the vertical direction. The strain sensor is connected to the twines and a light knock with a 500 g hammer generated the pulse on one side of the net while the sensor was fixed on the opposite side.
  b) Same as a) above, but the signal path was disturbed by 3 different holes as shown in FIG. 19.
    i. The time series recorded in this experiment are shown in FIG. 20.
    ii. The frequency spectra of the signals recorded this experiment are shown in FIG. 21
  c) A full size net pen for fish farming. A diver generated light shafing at 10 m water depth while the strain signal was measured with a piezoelectric strain gauge mounted as shown in FIGS. 12 and 13. The resulting signal is shown in FIG. 22.
  d) Same as c), but the diver generated a light tension wave at 10 m of water depth. The resulting signal is shown in FIG. 23.

Note that the mesh size in all cases was 2 cm and the twine diameter was 2 mm. The net material was nylon and the fish pen net used in c) was impregnated to avoid marine growth.

The instrumentation system described above may be used on barriers used during fishing with nets, i.e. trawling and seine fishing. The system can thereby report the tension state of the net and show the current tension signature compared to a reference signature which again can be used to reveal potential damage to the net or a damage that has already occurred.

In a preferred embodiment, the sensor nodes include a piezoelectric strain gauge based tension sensor (10) (from for example TE Connectivity). The gauge has dynamic response and is glued to a nylon web and connected to an amplifier controlled by a processor (for example a CC1352R from Texas Instruments, with Bluetooth and Sub-GHz radio link). The nodes may also include a 3-axis accelerometer (for example FXLS8471QR1 from NXP/Freescale) and a pressure sensor (for example Keller Series 10 OEM or a Bosch BMP280). The node communicates electrically via RS485 interface, a fibreoptic modem or via Bluetooth and/or a Sub-GHz radio link. In the latter case, Bluetooth can be used to communicate directly to an operator using a mobile phone with Bluetooth and the Sub-GHz radio link can be used to communicate with a central computer (26). The node has a clock that can be synchronized so that all sensors and actuators in a network has a common timebase as this is essential for time averaging. The node also has the capability of storing time series in memory for later transfer to a central computer.

In the preferred embodiment, the tension sensors (20) can measure the dynamic system response. The system also includes some metal foil strain gauge sensors (from for example from Hottinger Baldwin Messtechnik GmbH). Hence, static tension may reveal the load on the net and forces due to environmental excitation as well as forced excitation generated by an actuator in the bottom weight (16). The instrumentation system can measure the dynamic and static signatures. These signatures can be compared to reference signatures obtained with the net in a known reference state and can be used to decide if the net is in a different state, for example if there is a hole in the net. The actuators will be controlled from the computer (26) via cable (27).

The computer (26) will have means in the form of software to compute both static and dynamic system response signatures of the net (1) and to separate long time trends from abrupt changes in signatures based on static conditions, environmental excitation as well as forced excitation.

The invention claimed is:

1. An instrumentation system for a net barrier (1), the instrumentation system comprising:
   at least one tension sensor node (3); and
   a computer (26);
   wherein the at least one tension sensor node (3) is attached to one or more threads (6) of the net barrier (1);
   wherein the at least one tension sensor node (3) is connected to the computer (26), and wherein the computer (26) monitors tension as strain in the one or more threads (6);
   wherein an actuator (25) is used to generate tension in the net barrier (1);
   wherein the at least one tension sensor node (3) measures the resulting accelerations and tensions; and
   wherein the computer (26) analyses the data and detects changes from the ideal response obtained with the net barrier (1) with acceptable integrity.

2. The instrumentation system according to claim 1, wherein the computer (26) issues a signal when a tension change in the one or more threads (6) occurs.

3. The instrumentation system according to claim 1, wherein the system comprises multiple sensor nodes (3)

connected to multiple threads (6) and the computer (26), and wherein the computer (26) monitors the tension field of the entire net barrier (1) or a section thereof.

4. The instrumentation system according to claim 2, wherein the computer (26) issues an alarm when the tension changes are above predetermined threshold-values, or wherein the computer (26) issues an alarm when the tension changes are above predetermined threshold-values when the measured tension is compared to reference tension values measured under similar or identical external conditions.

5. The instrumentation system according to claim 1, wherein the at least one sensor node (3) contains means for measurement of acceleration, and wherein the acceleration is measured along minimum one axis, and wherein the tension and acceleration measurements are used to determine tension as a function of acceleration.

6. The instrumentation system according to claim 4, wherein the at least one sensor node (3) contains means for measurement of barometric or underwater pressure.

7. The instrumentation system according to claim 1, wherein a tension sensor (20) is a strain sensor (11) and can measure static as well as dynamic tension.

8. The instrumentation system according to claim 1, wherein a tension sensor (20) has a piezoelectric stack (7) or piezoelectric film (10), and can measure dynamic tension.

9. The instrumentation system according to claim 1, wherein the at least one tension sensor node (3) can measure tension during environmental excitation of the net barrier (1).

10. The instrumentation system according to claim 1, wherein the actuator (25) acts on one or more clump weights (16).

11. The instrumentation system according to claim 1, wherein the actuator (25) is concentric (13) and acts on meshes of the net barrier (1).

12. Use of a sensor node (3) according to claim 3, for the determination of static tension in a rope, web sling or load strap, wherein a tension wave pulse travels between at least two sensors (11), and wherein the distance between these at least two sensors (11) is known, and wherein the measured speed of the tension wave pulse (transmit time) is indicative of the static tension (load) of the rope, web sling or load strap.

* * * * *